United States Patent
Hagihara

(10) Patent No.: US 8,063,962 B2
(45) Date of Patent: Nov. 22, 2011

(54) SOLID-STATE IMAGING APPARATUS AND OPERATION FOR CONTROLLING THE OUTPUT OF IMAGE SIGNALS TO ALLOW TIME FOR AN EXTERNAL CIRCUIT TO PROCESS THE IMAGE SIGNALS

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 372 days.

(21) Appl. No.: 12/400,075

(22) Filed: Mar. 9, 2009

(65) Prior Publication Data
US 2009/0231476 A1 Sep. 17, 2009

(30) Foreign Application Priority Data

Mar. 7, 2008 (JP) ................................. 2008-057520
Feb. 17, 2009 (JP) ................................. 2009-033699

(51) Int. Cl.
*H04N 5/335* (2011.01)
*H04N 3/14* (2006.01)

(52) U.S. Cl. ....................................... 348/304; 348/308
(58) Field of Classification Search ........... 348/300–308
See application file for complete search history.

(56) References Cited

U.S. PATENT DOCUMENTS

| 6,493,025 | B1 | 12/2002 | Kiriyama et al. |
| 6,897,429 | B1* | 5/2005 | Turner et al. ............... 250/214 R |
| 7,893,972 | B2* | 2/2011 | Kaplinsky et al. ............ 348/246 |
| 2003/0189660 | A1 | 10/2003 | Ishida et al. |
| 2008/0058601 | A1* | 3/2008 | Fujimori ........................ 600/167 |
| 2008/0258042 | A1* | 10/2008 | Krymski ..................... 250/208.1 |

FOREIGN PATENT DOCUMENTS

| JP | 11-261894 A | 9/1999 |
| JP | 2006-081048 A | 3/2006 |

* cited by examiner

Primary Examiner — Nelson D. Hernández Hernández
(74) Attorney, Agent, or Firm — Westerman, Hattori, Daniels & Adrian, LLP

(57) ABSTRACT

A solid-state imaging apparatus including: an imaging section having pixels arranged into a matrix; a conversion section for digitizing pixel signals; a block memory section formed of a first line memory corresponding to at least N lines (N being an integral number of 2 or more) for retaining the pixel signals; and a drive control section for controlling so as to read out and cause to be retained at the block memory section pixel signals corresponding to M lines (M being an integral number between 2 and N inclusive) in a period shorter than period necessary for an external circuit to process pixel signals corresponding to 1 line, and then controlling so as to bring into halt condition at least one of imaging section and conversion section in a remaining period in the period necessary for external circuit to process pixel signals corresponding to M lines.

4 Claims, 5 Drawing Sheets

SOLID-STATE IMAGING APPARATUS AND OPERATION FOR CONTROLLING THE OUTPUT OF IMAGE SIGNALS TO ALLOW TIME FOR AN EXTERNAL CIRCUIT TO PROCESS THE IMAGE SIGNALS

This application claims benefit of Japanese Patent Applications No. 2008-57520 filed in Japan on Mar. 7, 2008 and No. 2009-33699 filed in Japan on Feb. 17, 2009, the contents of which are incorporated by these references.

BACKGROUND OF THE INVENTION

The present invention relates to solid-state imaging apparatus and apparatus using the same which are widely used for example as image input apparatus, and more particularly it is related to solid-state imaging apparatus and apparatus using the same which is capable of achieving a reduction in power consumption without using a frame memory especially when operating at a low frame rate.

Various types such as those of MOS or CCD have been proposed and are practically used as solid-state imaging apparatus. It is relatively easy with the MOS type, as compared to the CCD type, to internally provide peripheral circuits other than an imaging section and it has fewer peripheral component parts. In addition, since it has a capability of longer-time drive because it uses less power, it is increasingly used in recent years in a wide range of products. Those having an internally provided frame memory as a part of the peripheral circuits have been disclosed for example in Japanese Patent Application Laid-Open hei-11-261894.

Supposing the CCD type, in achieving a further reduction in power consumption especially at the time of a low frame rate operation, methods have been disclosed for example in Japanese Patent Application Laid-Open 2006-81048 where circuits consuming a large amount of power such as an output section are continuously operated only in a partial period within one frame and are not operated in other periods. Further, in the case of using MOS solid-state imaging apparatus, it is readily conceivable to internally provide a frame memory so that circuits with a large power consumption such as an imaging section and a conversion section are operated only in periods of accessing the frame memory, whereby a reduction in power consumption is achieved by not operating the large-power-consumption circuits in periods of not accessing the frame memory.

SUMMARY OF THE INVENTION

In a first aspect of the invention, there is provided a solid-state imaging apparatus including: an imaging section having pixels arranged into a matrix each pixel for outputting a pixel signal corresponding to the amount of an incident electromagnetic wave; a conversion section for digitizing pixel signals outputted from the imaging section; a block memory section formed of a first line memory corresponding to at least N lines (N being an integral number of 2 or more) for retaining the digitized pixel signals; and a drive control section for controlling so as to read out and cause to be retained at the block memory section pixel signals corresponding to M lines (M being an integral number between 2 and N inclusive) of the imaging section in a period shorter than period necessary for an external circuit receiving the pixel signals read out from the block memory section to process pixel signals corresponding to 1 line so that the number of transitions from a halt condition to an operational condition is fewer than when the operational condition and the halt condition are sequentially executed, and then controlling so as to bring into the halt condition at least one of the imaging section and the conversion section in a remaining period in the period necessary for the external circuit to process pixel signals corresponding to M lines.

In a second aspect of the invention, the drive control section in the solid-state imaging apparatus according to the first aspect, after consecutively reading out the pixel signals corresponding to N lines and causing them to be retained at the block memory section, effects control so as to bring at least one of the imaging section and the conversion section into the halt condition in a period remaining until a period necessary for the external circuit to process pixel signals corresponding to N lines.

In a third aspect of the invention, the block memory section in the solid-state imaging apparatus according to the first or second aspect uses a part of a second line memory for retaining pixel signals for use in a detection/correction of defect.

In a fourth aspect of the invention, there is provided a capsule type endoscope including: the solid-state imaging apparatus according to any one of the first to third aspects; and a circuit for processing the pixel signals from the solid-state imaging apparatus.

DESCRIPTION OF THE PREFERRED EMBODIMENTS

Some embodiments of the solid-state imaging apparatus according to the invention and apparatus to which the same is applied will be described below with reference to the drawings.

Embodiment 1

Figure 1:
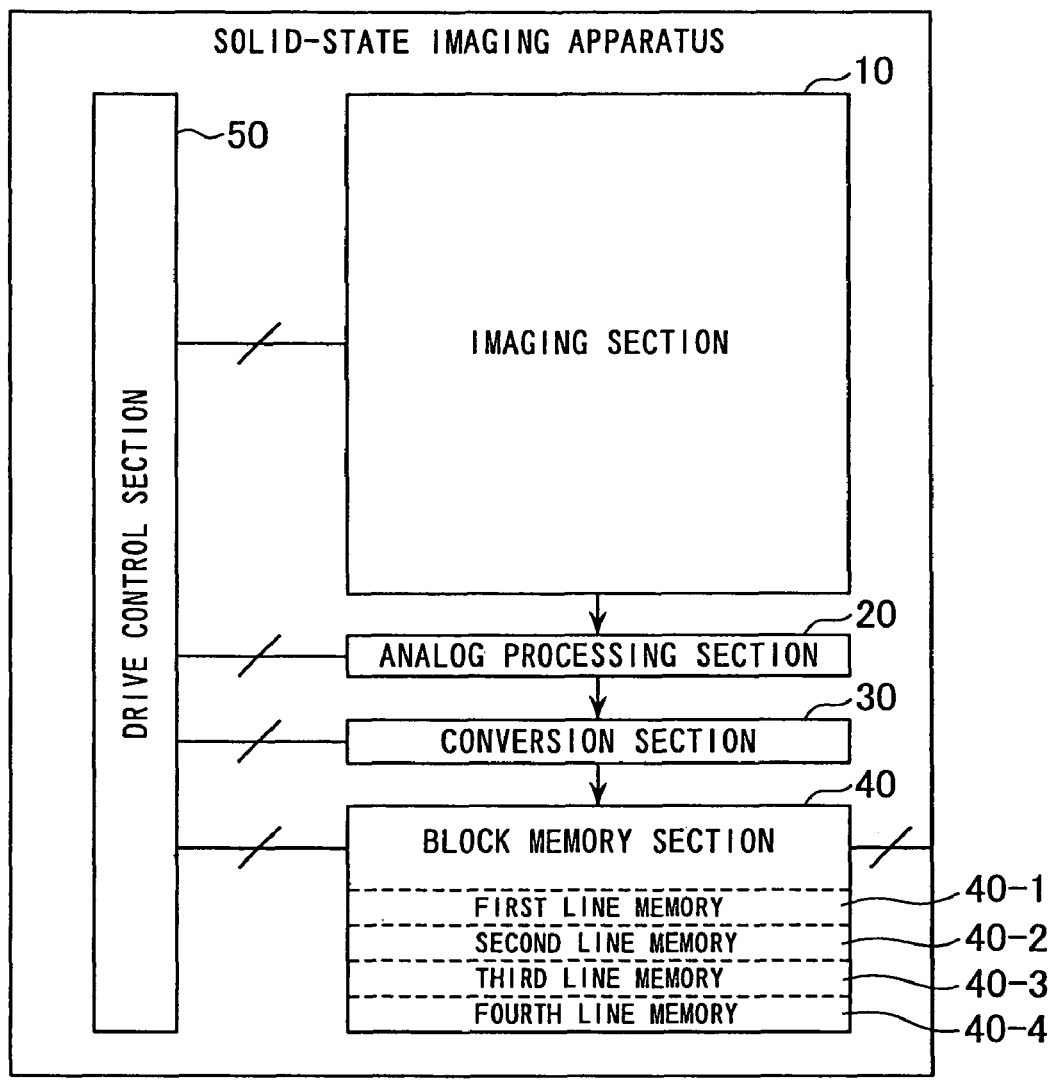
FIG. 1 is a block diagram showing Construction of an embodiment of the solid-state imaging apparatus according to the invention.

A first embodiment of the solid-state imaging apparatus according to the invention will now be described. This embodiment corresponds to an embodiment according to the first to third aspect of the invention. FIG. 1 is a block diagram showing construction of the solid-state imaging apparatus according to the first embodiment. As shown in FIG. 1, the solid-state imaging apparatus according to the first embodiment includes: an imaging section 10 having pixels arranged into a matrix for outputting pixel signal corresponding to the amount of incident electromagnetic wave; an analog processing section 20 for effecting analog processing of signals from the imaging section 10; a conversion section 30 for digitizing signals from the analog processing section 20; a block memory section having first to fourth, i.e. four line memories 40-1 to 40-4 for retaining signals digitized at the conversion section 30; and a drive control section 50 for controlling drives of the imaging section 10, the analog processing section 20, the conversion section 30, and the block memory section 40. It is different from the prior-art solid-state imaging apparatus in that the block memory section 40 having the first to fourth line memories 40-1 to 40-4 is separately provided.

The block memory section 40 in FIG. 1 is shown as but is not limited to one formed of the four line memories or the first to fourth line memory 40-1 to 40-4. It is possible that line memories separately provided to detect/correct defect be used also as the first to fourth line memories of the block memory section 40. Further, though illustration is omitted, it is also possible as required to provide components having CDS processing function or amplification function at the analog processing section 20.

Figure 2:
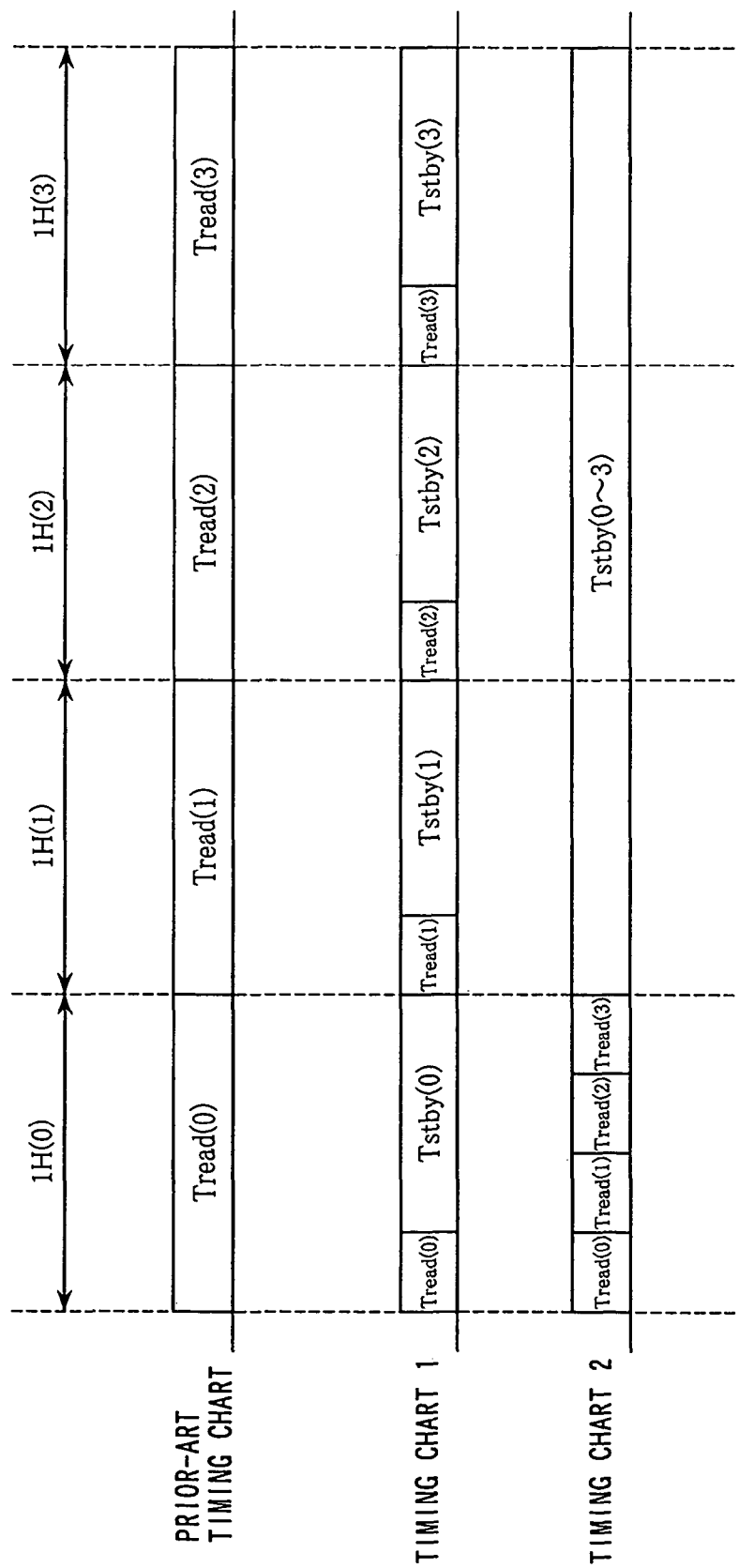
FIG. 2 is a timing chart for explaining an example of operation of the embodiment shown in FIG. 1.

An operation of the first embodiment having such construction as compared to a prior-art example will now be described by way of a timing chart shown in FIG. 2. In this timing chart, 1H(*) period (*=0 to 3) refers to 1 horizontal period requested by external circuits (for example, a transmitting circuit, a receiving circuit, a signal processing circuit, etc.) to which the pixel signals read out from the block memory section 40 are inputted, i.e. a period necessary for the external circuits to process (for example to transmit) pixel signals corresponding to 1 line. Further, "PRIOR-ART TIMING CHART" in FIG. 2 shows an example of operation in a prior-art solid-state imaging apparatus for reading out from the analog processing section the signals from the imaging section and digitizing at the conversion section. It should be noted that Tread(*) period refers to an operation period of the imaging section 10, the analog processing section 20, and the conversion section 30 (=accessing period to the block memory section 40), and Tstby(*) period refers to a halt period of the imaging section 10, the analog processing section 20, and the conversion section 30 (=not accessing period to the block memory section 40). In the halt periods, it is also possible to stop the supplying of power to at least one of the analog processing section and the conversion section. The power consumption can be thereby reduced as compared to the case where a halt period is not provided. Here, (*) mark signifies the order of succession of period in 1H(*) periods and in the prior-art timing chart of Tread(*) periods, and signifies in "TIMING CHARTS 1 AND 2" the number of the first to fourth line memories 40-1 to 40-4 of the block memory section 40.

In the prior-art example as shown in FIG. 2, each horizontal scanning period 1H(0) to 1H(3) constitutes Tread(0) to Tread (3) periods, respectively. In a first operation example of the present embodiment shown in "TIMING CHART 1", by contrast, Tread(*) period and Tstby(*) period are sequentially executed within each one horizontal scanning period 1H(*). This is done such that the imaging section 10, the analog processing section 20, and the conversion section 30 are driven at higher rate as compared to the prior-art solid-state imaging apparatus based on the providing of the block memory section 40, thereby providing Tstby(*) period in each horizontal scanning period (1H period) by making shorter Tread(*) period that requires 1H(*) period in the prior-art operation. By thus bringing the imaging section 10, the analog processing section 20, and the conversion section 30 into a halt condition in Tstby period in each 1H period, it is possible to achieve a reduction in power consumption by reducing (a large amount of) power that would be consumed in their operating condition. It should be noted that "halt condition of the imaging section 10" in the above description means a condition where only the outputting of pixel signal is halted.

A more preferable drive method is shown in a second operation example in "TIMING CHART 2". In "TIMING CHART 2 (second operation example)", Tread(0) to (3) periods i.e. periods of accessing to the first to fourth line memories 40-1 to 40-4 of the block memory section 40 within respective period of 1H(0) to 1H(3) or the first to fourth horizontal scanning period are consecutively provided in 1H(0) period or the first horizontal scanning period. The 1H(1) to 1H(3) periods of the second to fourth horizontal scanning periods but the 1H(0) period are then made as Tstby (0) to (3) periods which are non-accessing periods. Reduced thereby is, the number of times of transition (=time) necessary to make a transition of the analog processing circuit 20 and the conversion section 30 from an operating condition to a halt condition or from a halt condition to an operating condition. The second operation example is effective especially when the power consumed in a transitional condition is greater than the power consumed in a halt condition or when a relatively long period is required as the transition time as compared to the Tread(*) period or the Tstby(*) period. With the second operation example, the number of times of transition (=time) is reduced so that a further reduction in power consumption is made possible.

Figure 3:
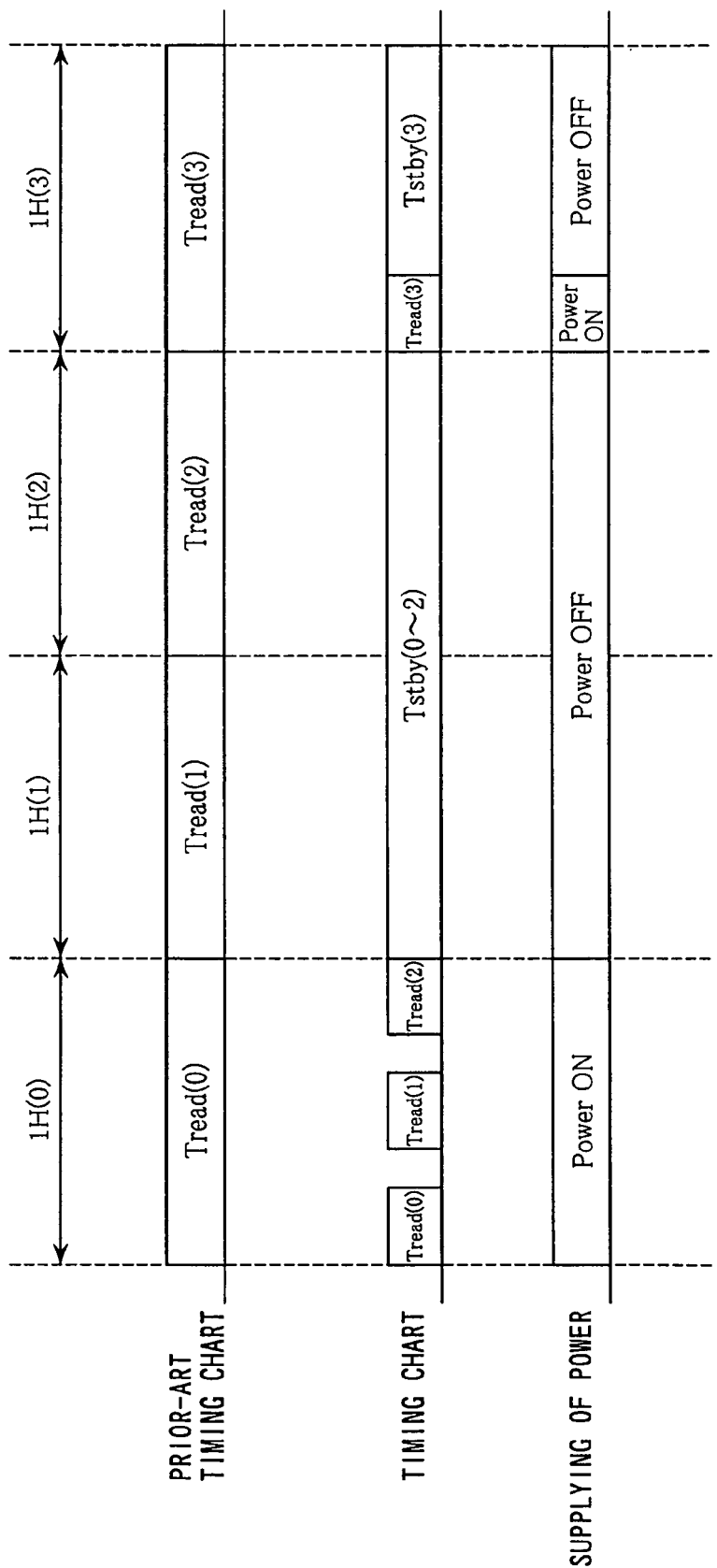
FIG. 3 is a timing chart for explaining another example of operation of the embodiment shown in FIG. 1.
Figure 4:
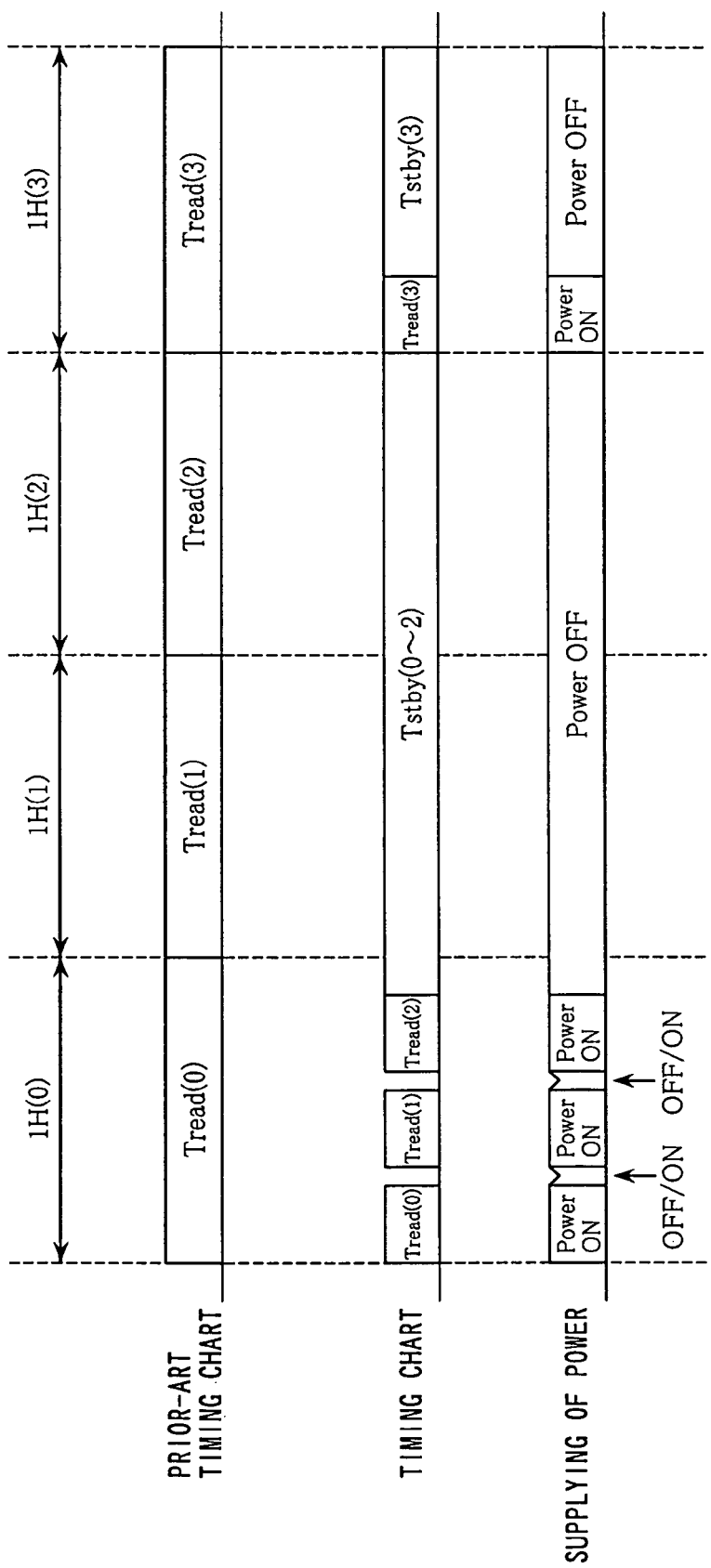
FIG. 4 is a timing chart for explaining yet another example of operation of the embodiment shown in FIG. 1.

Further, the number of times of transition can also be reduced by means of an operation as shown in FIG. 3 or FIG. 4. In the operation example shown in FIG. 3: Tread (0) to (2) periods that are the accessing periods to the first to third line memories 40-1 to 40-3 with respective interposed short periods for halting the accessing to the line memory are provided in 1H(0) period or the first horizontal period; the following horizontal periods 1H(1) and 1H(2) are provided as Tstby(0) to (2) periods that are non-accessing periods; and a first portion of 1H(3) period that is the next horizontal period is provided as Tread(3) period that is an accessing period to the fourth line memory 40-4 and the remaining period in 1H(3) period is provided as Tstby(3) period that is a non-accessing period. In this operation example, the supplying of power neither to the analog processing section nor to the conversion section is halted in the period of halting the accessing to the block memory section in 1H(0) period or the first horizontal period. Also with such an operation example as this, an advantage of reducing power consumed in transitional condition is obtained. Accordingly, this operation example can also be regarded as reducing the number of times of transition as 1H(0) period or the first horizontal period is considered as one operational period without an interposed halt period.

Furthermore in the case of the operation example shown in FIG. 4, the period of halting the accessing to the block memory section in 1H(0) period or the first horizontal period in the operation example shown in FIG. 3 is made shorter to an extent that the lowering and the rising of power supply are overlapped so that supplying of power for the accessing to the next line memory is resumed before the supplying of power is completely halted. Also with such an operation example, an advantage of reducing power consumed in transitional condition is obtained. Accordingly, the case of the operation example shown in FIG. 4 can also be regarded as reducing the number of times of transition as it is considered as one operation period without an interposed halt period.

According to the present embodiment as has been described, it is possible to achieve a solid-state imaging apparatus in which an increase in chip area is controlled so that a reduction in power consumption can be achieved especially at the time of operating at a low frame rate (where a horizontal scanning period becomes longer).

Embodiment 2

Figure 5:
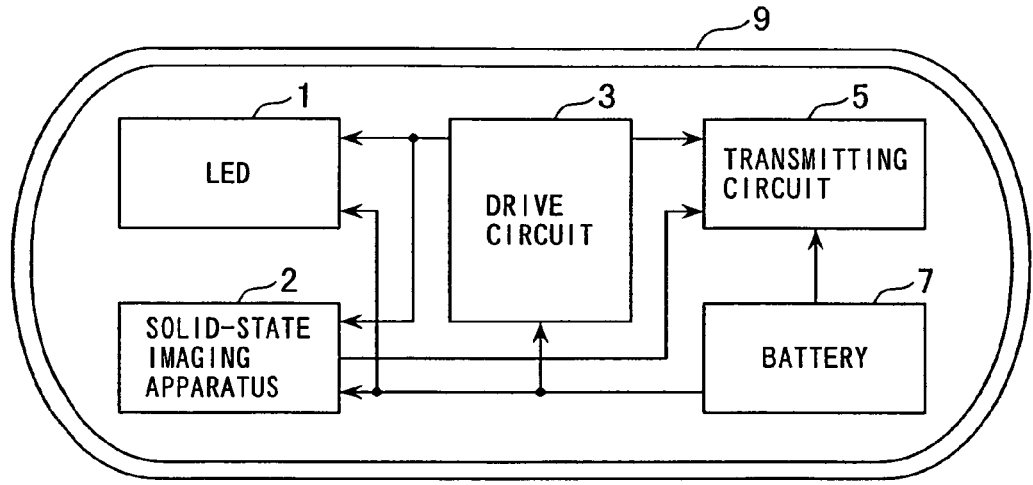
FIG. 5 is a block diagram schematically showing construction of an embodiment of capsule type endoscope according to the invention.

An embodiment of the capsule type endoscope to which the apparatus according to the invention is applied will be described below as a second embodiment of the invention. This embodiment corresponds to an embodiment according to the fourth aspect of the invention. FIG. 5 is a block diagram showing construction of the capsule type endoscope according to the present embodiment. The capsule type endoscope according to this embodiment as shown in FIG. 5 is for example to observe an interior surface of the digestive system of a subject, and encapsulates an LED 1, a solid-state imaging apparatus 2, a drive circuit 3, a transmitting circuit 5, and a battery 7 into a capsule-like case body 9. The LED 1 is a light source for emitting a light in accordance with voltage signal supplied from the drive circuit 3, and the solid-state imaging apparatus 2 is a solid-state imaging apparatus having the construction shown in FIG. 1. The drive circuit 3 receives a supply of power from the battery 7 and for example generates a synchronizing signal that is necessary in driving the LED 1 and the solid-state imaging apparatus 2.

The transmitting circuit 5 is a circuit for effecting radio transmission of an image signal, generating and transmitting from an antenna (not shown) a radio wave signal modulated based on an output of the solid-state imaging apparatus 2. Further, the battery 7 supplies a power to each section in addition to the drive circuit 3. The case body 9 is formed into a watertight structure having a cylindrical form for example with a material that is not eroded by gastric juice, etc. By forming it into a cylindrical form, the case body 9 is made readily movable along its axial direction within human body with its end portion positioned at the top. Thus the LED 1 and the solid-state imaging apparatus 2 are disposed so that they face the outside for example from the end portion so as to obtain an image toward which it is moved.

The shape of the box body 9 in FIG. 5 for example typically represents a cross section along the center axis of the cylindrical case body 9 where left and right ends thereof corresponds to the end portions of the cylindrical case body 9. The cross section of the end portion of the cylindrical case body 9 then is rounded as shown so that the case body 9 is smoothly advanced along its axial direction within human body. The physical examination using a capsule type endoscope presupposes that the subject swallows the capsule type endoscope by oneself, i.e. one is to cause it to pass through the oral cavity. The size of the capsule-like case body 9 therefore is limited, and there is a limit also on the size of the LED 1, the solid-state imaging apparatus 2, the drive circuit 3, the transmitting circuit 5, and the battery 7 which are provided at the interior of the capsule type endoscope. Especially, the size (i.e. area) of the solid-state imaging apparatus 2 and the volume (and power capacity) of the battery 7 are largely affected by such limitation.

Figure 6:
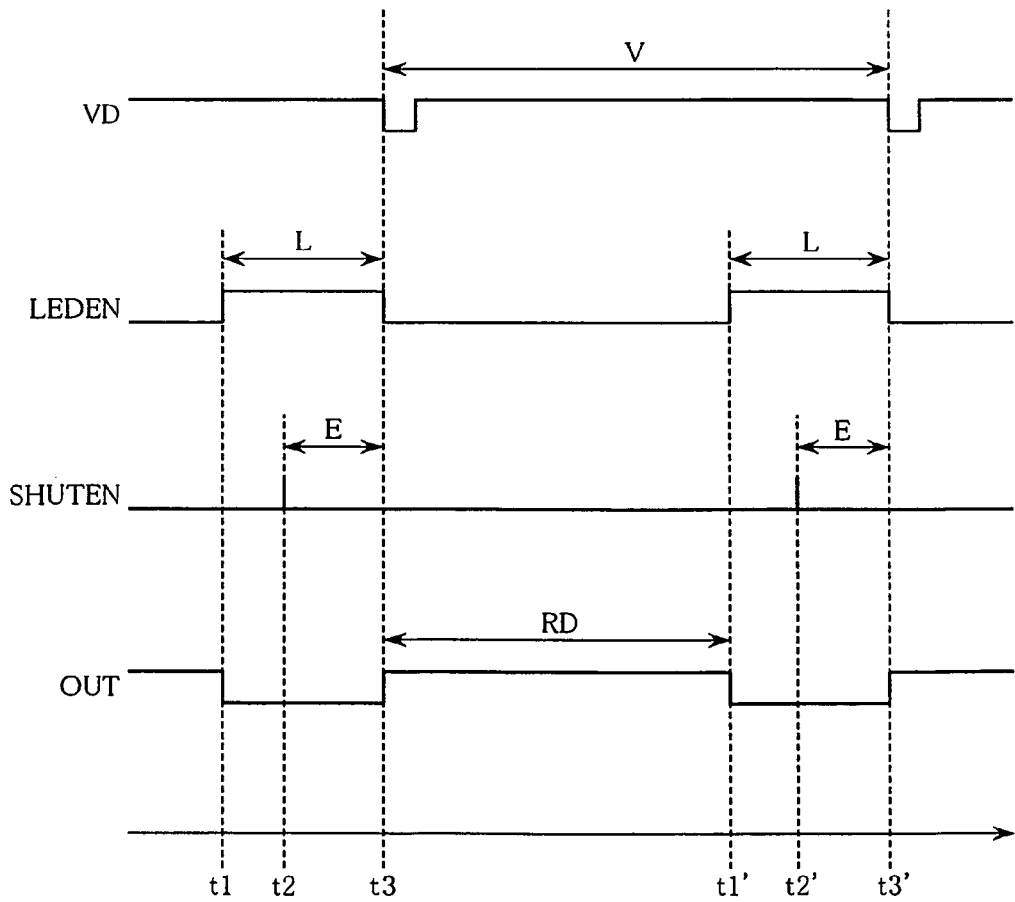
FIG. 6 is a timing chart for explaining operation of the embodiment shown in FIG. 5.

An operation of thus constructed capsule type endoscope will be now described by way of a timing chart shown in FIG. 6. Shown in this timing chart are the timings of: a vertical synchronizing signal VD; a voltage signal LEDEN supplied to the LED 1; a trigger pulse SHUTEN of electronic shutter signal; and a signal OUT outputted from the solid-state imaging apparatus 2. In a vertical scanning period V, the operation for reading signal from the solid-state imaging apparatus 2 (period RD) and the emitting operation of the LED 1 (period L) are sequentially executed.

Here, an image taking operation of one frame is started from an emission start time t1 of the LED 1. The emission start time t1 of the LED 1 is set for example at a timing that precedes a falling time t3 of the VD pulse by a predetermined time L, and, from this timing (t1), a voltage pulse is applied on the LED 1 to start an emission of light.

A start time t2 of an exposure period E is regulated by an electronic shutter operation to be preformed within an emission period L of the LED 1, and an accumulating operation is started based on time of completing the electronic shutter operation at which timing (t2) the exposure time E is started. Here, since a light source other than the LED 1 essentially does not exist within the human body, the exposure operation is ended when the LED 1 goes OFF. When the exposure period E ends, a read operation of signal from the solid-state imaging apparatus 2 (period RD) is started. The timing of the signal read operation (period RD) from the solid-state imaging apparatus 2 is as has been described by way of the timing chart of the first embodiment shown in FIG. 2. Further, of the power consumed by the LED 1, the solid-state imaging apparatus 2, the drive circuit 3, and the transmitting circuit 5 that are provided at the interior of the capsule-like case body 9, the ratio of the solid-state imaging apparatus 2 is relatively large, therefore making it essential to reduce power consumption at the solid-state imaging apparatus 2 in the capsule type endoscope.

By applying the solid-state imaging apparatus shown in the first embodiment to the present embodiment as has been described, it is possible to provide a capsule type endoscope which can be reduced in size and in which a reduction in power consumption can be achieved especially when it is operated at a low frame rate.

According to the invention, it is possible to achieve a solid-state imaging apparatus and in addition a capsule type endoscope in which an increase in chip area is checked and, especially at the time of low frame rate operation, power consumption can be reduced. The advantages of each aspect of the invention are as follows. According to the first and second aspects, a solid-state imaging apparatus capable of reducing power consumption can be achieved by reducing the number of times of transition (=time) to a halt condition of the imaging section and the conversion section. According to the third aspect, it is not necessary to separately provide a line memory as a block memory section so that a reduction in chip area becomes possible. According to the fourth aspect, it is possible to achieve a capsule type endoscope in which power consumption especially at the time of low frame rate operation can be reduced.

What is claimed is:

1. A solid-state imaging apparatus comprising:
an imaging section having pixels arranged into a matrix each pixel for outputting a pixel signal corresponding to an amount of an incident electromagnetic wave;
a conversion section for digitizing pixel signals outputted from said imaging section;
a block memory section formed of a first line memory corresponding to at least N lines (N being an integral number of 2 or more) for retaining said digitized pixel signals; and
a drive control section for controlling so as to read out and cause to be retained at said block memory section pixel signals corresponding to M lines (M being an integral number between 2 and N inclusive) of said imaging section in a period shorter than a period necessary for an external circuit receiving said pixel signals read out from said block memory section to process pixel signals corresponding to 1 line so that the number of transitions from a halt condition to an operational condition is fewer than when said operational condition and said halt condition are sequentially executed, and then controlling so as to bring into the halt condition at least one of said imaging section and said conversion section in a remaining period in a period necessary for the external circuit to process pixel signals corresponding to the M lines, wherein said drive control section, after consecutively reading out said pixel signals corresponding to N lines and causing them to be retained at said block memory section, effects control so as to bring at least one of said imaging section and said conversion section into the halt condition in a period remaining until a period necessary for the external circuit to process pixel signals corresponding to N lines.

2. The solid-state imaging apparatus according to claim 1, wherein said block memory section uses a part of a second line memory for retaining pixel signals for use in a detection/correction of defect.

3. A capsule type endoscope comprising: the solid-state imaging apparatus according to claim 1; and a circuit for processing said pixel signals from said solid-state imaging apparatus.

4. A capsule type endoscope comprising: the solid-state imaging apparatus according to claim 2; and a circuit for processing said pixel signals from said solid-state imaging apparatus.

* * * * *